United States Patent [19]
Riddle

[11] Patent Number: 5,822,836
[45] Date of Patent: Oct. 20, 1998

[54] REAR DRIVE M113 CONVERSION METHOD

[75] Inventor: Matthew Guy Riddle, San Jose, Calif.

[73] Assignee: United Defense LP, Arlington, Va.

[21] Appl. No.: 695,456

[22] Filed: Aug. 12, 1996

Related U.S. Application Data

[63] Continuation of Ser. No. 349,338, Dec. 5, 1994, Pat. No. 5,577,311.

[51] Int. Cl.⁶ .................................................. B21K 21/16
[52] U.S. Cl. ......................... 29/401.1; 89/36.08; 305/15
[58] Field of Search ............................. 29/401.1, 402.01, 29/402.04, 426.1, 426.2; 296/188; 89/36.08; 180/6.7, 9.1; 280/5.22; 305/15

[56] References Cited

U.S. PATENT DOCUMENTS 5,577,311  11/1996  Riddle ..................................... 29/401.1

Primary Examiner—David P. Bryant
Attorney, Agent, or Firm—Douglas W. Rudy; Michael B. K. Lee

[57] ABSTRACT

This invention pertains to a method of rear drive conversion of the M113 family of vehicles to provide a light, mobile and tactical hybrid vehicle. The method includes stripping an M113 to a base aluminum hull and providing modified or newly fabricated parts to enable the conversion. Using the rear drive conversion process disclosed herein, critical operations parameters such as volume under armor, mobility, air transportability and vehicle performance efficiency per unit weight are significantly increased.

9 Claims, 2 Drawing Sheets

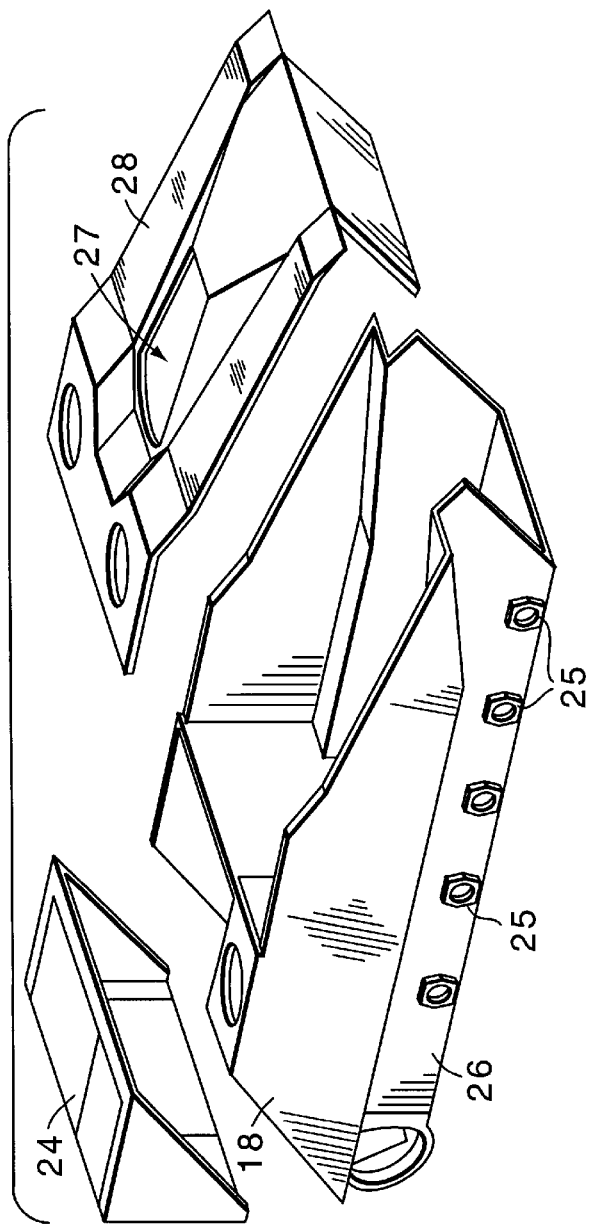
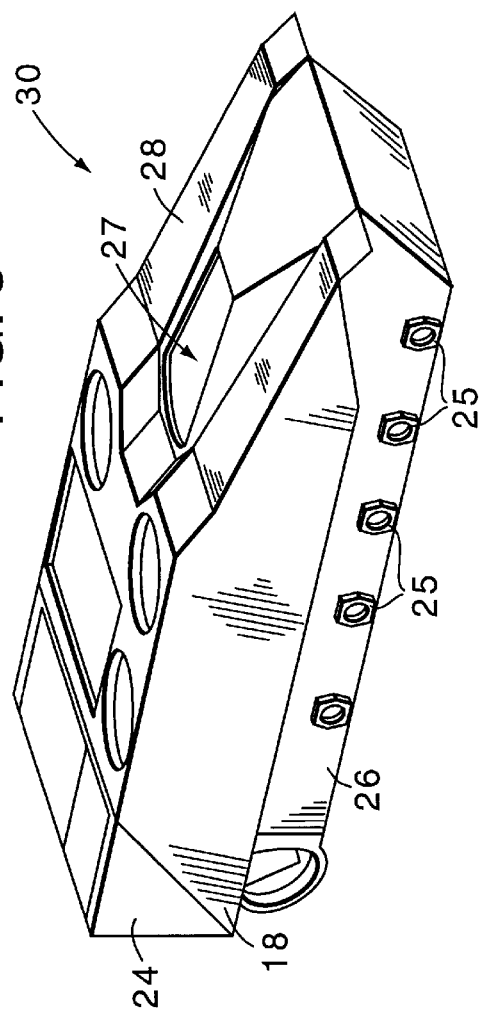

the
REAR DRIVE M113 CONVERSION METHOD

This application is a continuation of application Ser. No. 08/349,338, filed Dec. 5, 1994, now U.S. Pat. No. 5,577,311.

FIELD OF THE INVENTION

The present invention provides a method for converting a family of the M113 vehicles to develop a low cost and light vehicle for use in scouting and other tactical missions.

SUMMARY OF THE INVENTION

The present invention is primarily concerned with the modernization of M113 family of vehicles to provide a cost effective, light and tactical vehicle. This family of vehicles has undergone various changes over the years. The present invention is distinguished in that minimal changes are made to significantly improve the operational and functional features of the M113 vehicles.

BRIEF DESCRIPTION OF THE DRAWINGS

FIG. 2B is an explosion view of an M113 structure with a new rear stowage area and a new front plate the major parts indicated.

FIG. 3 is a perspective view of a modified M113 structure.

DESCRIPTION OF THE PREFERRED EMBODIMENT

The present invention provides a method of modifying and converting an M113 vehicle to develop a low cost and light tactical vehicle for use in scouting, reconnaissance and other missions.

Figure 1:
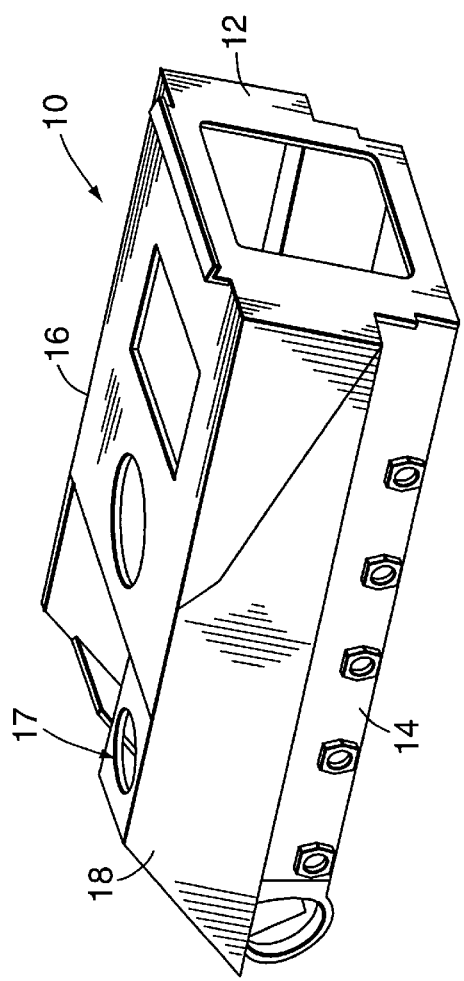
FIG. 1 a perspective drawing of an M113 structure with the driver's station shown in its original position.
Figure 2A:
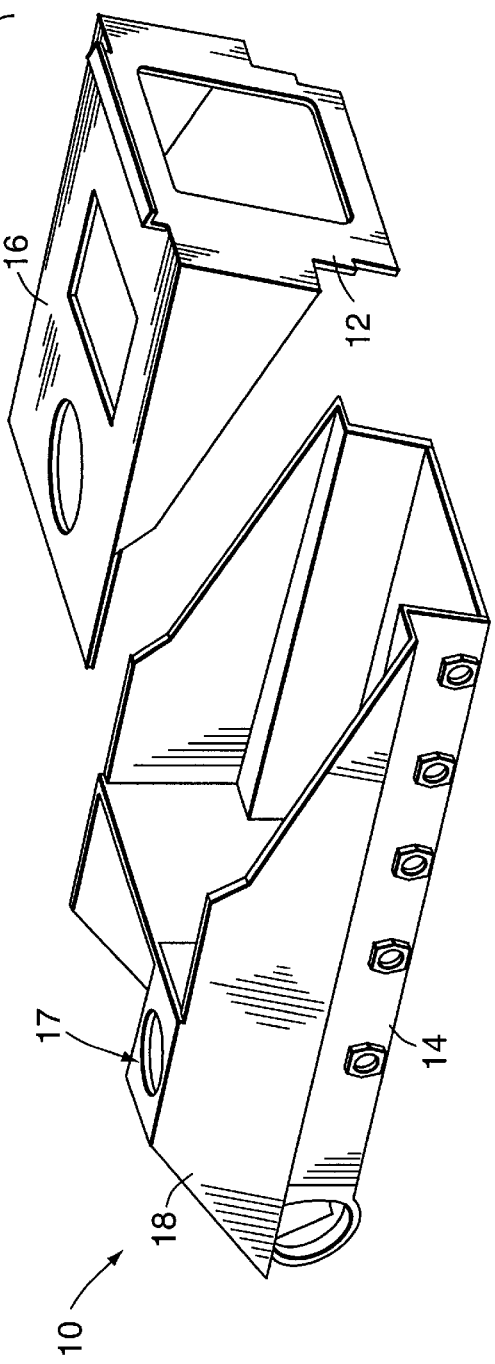
FIG. 2A is an explosion view of an M113 structure with the rear portion removed and the rear sponson area indicated.

FIG. 1 shows a perspective drawing of an M113 structure 10 with the driver's station shown in its original position. FIG. 2A is an exploded view of structure 10. Rear plate 12 is disposed between lower hull 14 and top plate 16. Further, upper hull 18 is attached to lower hull 14.

FIG. 2A shows an exploded view of an M113 structure. Rear plate 12 and top plate 16 are disengaged from upper hull 18 and lower hull 14.

FIG. 2B is an explosion view of a modified M113 vehicle. New stowage area 24 and modified lower hull 26 are matched to new front plate 28. FIG. 3 shows an assembly 30 of a modified rear drive M113 vehicle.

The discussion hereinabove relates to the most significant structural and component organizations of the rear drive M113 conversion. The method of conversion, disclosed in the present invention, under a best mode scenario is discussed hereinbelow.

Referring to FIGS. 1, 2A, 2B and 3, the conversion process includes starting with an M113 type vehicle. The process starts with the removal of a rear portion (not shown) of the M113 vehicle. Lower hull 14 is modified to new lower hull 26. In the rear sponson areas new suspension mounting pads 25 are added. Further, new stowage area 24 and front plate 28 are mounted on upper hull 18 and new lower hull 26. The resulting structure, rear drive M113 structure 30, is shown in FIG. 3.

The modified M113 provides a new driver station 27 as compared to the old driver station 17 (See FIG. 1). Functionally all of the power station (not shown) installations such as the cooling system, exhaust, powertrain, air cleaners, etc., remain unchanged. Suspension mounting pads 25 are mounted at the rear sponson. The gear (not shown) is reversed in the transmission to convert to a rear drive.

Accordingly, the rear drive M113 conversion method of the present invention is initiated by starting with a 'thick skinned' M113 which include the families of M901, M981, M577, M1059, M106, M125 and the like vehicles. All the components are removed and the vehicle is stripped to a bare aluminum hull. Top plate 16 and rear plate 12 are removed and front plate 28 is added. A new stowage area 24 is fabricated and installed as shown. The suspension components are refurbished, suspension mounting pads 25 installed and the reverse gearset (not shown) and the transmission are set in place to provide conversion to a rear drive Further, the powertrain (not shown) is installed, the driver's station is relocated at new location 27. Finally, the vehicle is assembled to provide new rear drive M113 structure 30.

Through the conversion method disclosed herein, a capable and effective scout vehicle can be built. The rear drive M113 of the present invention enables heavy machine gun protection, modular appliqué armor, high performance suspension and powertrain. Further, it utilizes spare parts common to fielded M113 vehicle fleet and thereby enables cost effective maintenance. The final product is a light, compact and efficient tactical vehicle. The rear drive M113 is designed to be roll-on/ roll-off C-130 transportable and air dropable. Because of the light weight and efficient use of space volume, two rear drive M113 vehicles are transportable on a single C-130.

While a preferred embodiment of the rear drive M113 appreciated that various changes and modifications may be made therein without departing from the spirit of the invention as defined by the scope of the appended claims.

What is claimed is:

1. A rear-drive conversion method for an armored vehicle comprising the steps of:

providing an armored vehicle, said vehicle including a front end, a rear end, a rear portion, an upper hull and a lower hull with a rear sponson area;

selectively disassembling said vehicle to a base hull including said front end, said rear end, said rear portion, said upper hull, and said lower hull;

removing said rear portion from said base hull;

modifying the configuration of said lower hull;

adding a new front plate to said lower hull at said rear end; and fastening together said upper hull, said modified lower hull, and said new front plate.

2. A conversion method for converting a vehicle having a drive configuration for driving said vehicle in a first primary direction into a vehicle for driving said vehicle in a second primary direction normally opposite said first primary direction comprising the steps of:

providing a vehicle having a drive configuration including drive components for driving said vehicle in said first primary direction;

modifying a single one of said drive components so that said drive configuration will drive said vehicle in said second primary direction rather than in said first primary direction.

3. A conversion method for converting a vehicle from a vehicle having a first primary drive direction to a vehicle having a second primary drive direction normally opposite said first primary drive direction comprising the steps of:

providing a vehicle having a drive configuration whereby said vehicle is driven in said first primary drive direction, said vehicle including a front end, a rear end, a rear portion, an upper hull, a top plate representing a horizontal plane, and a lower hull with a rear sponson area;

selectively disassembling said vehicle to a base hull including said front end, said rear end, said rear portion, said upper hull, said top plate and said lower hull;

removing said rear portion from said base hull;

modifying the configuration of said lower hull;

adding a new front plate to said modified lower hull at said rear end of said base hull;

fastening together said upper hull, said modified lower hull, said top plate and said new front plate, whereby said new front plate is disposed at the front of said vehicle when said vehicle is driven in said second primary drive direction.

4. The method according to claim 3 wherein the method further includes the step of adding suspension mounting pads to each side of said modified lower hull.

5. The method according to claim 4 wherein said suspension mounting pads are located in said rear sponson area of said lower hull.

6. The method according to claim 3 wherein said new front plate includes oblique and aerodynamic surfaces.

7. The method according to claim 6 wherein said surfaces are below said horizontal plane of said top plate.

8. A conversion method for converting an armored vehicle of a given weight to a converted vehicle of a lesser weight comprising the steps of:

providing an armored vehicle including a front end, a rear end, a rear portion, a top plate, an upper hull and a lower hull with a rear sponson area;

removing said rear portion, including a portion of said top plate from said armored vehicle thereby reducing the weight of said armored vehicle;

modifying the configuration of said lower hull thereby further reducing the weight of said armored vehicle;

fabricating a front plate to replace said rear portion and said portion of said top plate;

adding said new front plate to said upper hull and said modified lower hull at said rear end of said armored vehicle;

fastening together said upper hull, said modified lower hull and said front plate, thereby forming said converted vehicle.

9. The method according to claim 8 wherein said front plate is disposed at the front of the converted vehicle and the original front portion of the armored vehicle becomes the rear portion of the converted vehicle.

* * * * *